United States Patent
Price et al.

(10) Patent No.: US 11,672,234 B1
(45) Date of Patent: *Jun. 13, 2023

(54) DOG COLLAR

(71) Applicant: S-K Victory, LLC, Fort Lauderdale, FL (US)

(72) Inventors: Ken Price, Fort Lauderdale, FL (US); Scott Coff, Fort Lauderdale, FL (US)

(73) Assignee: S-K VICTORY, LLC, Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/054,413

(22) Filed: Nov. 10, 2022

Related U.S. Application Data

(63) Continuation of application No. 17/210,727, filed on Mar. 24, 2021, now Pat. No. 11,510,396.

(60) Provisional application No. 62/994,910, filed on Mar. 26, 2020.

(51) Int. Cl.
*A01K 27/00* (2006.01)

(52) U.S. Cl.
CPC .......... *A01K 27/001* (2013.01); *A01K 27/005* (2013.01)

(58) Field of Classification Search
CPC .................................................. A01K 27/005
See application file for complete search history.

(56) References Cited

U.S. PATENT DOCUMENTS

| | | | | |
|---|---|---|---|---|
| 6,016,772 A | * | 1/2000 | Noyes | A01K 27/006 224/664 |
| 9,775,328 B1 | * | 10/2017 | Fidrych | A01K 27/002 |
| 2016/0143254 A1 | | 5/2016 | Shaanti | |
| 2016/0286763 A1 | | 10/2016 | Durrant | |
| 2017/0196198 A1 | * | 7/2017 | Scott | B68B 3/06 |
| 2020/0093097 A1 | | 3/2020 | Robinson | |
| 2020/0260690 A1 | * | 8/2020 | Verna | A01K 27/003 |
| 2022/0046896 A1 | | 2/2022 | Patterson | |

* cited by examiner

*Primary Examiner* — Magdalena Topolski
*Assistant Examiner* — Katherine Anne Kloecker
(74) *Attorney, Agent, or Firm* — Lucas & Mercanti, LLP

(57) ABSTRACT

In various representative aspects, the present invention relates generally to an improved dog collar that protects the safety of the dog and its larynx and trachea by utilizing padded and resilient cushions on the inside of the dog collar in combination with one or more elastic bands within the perimeter of the dog collar. These elements provide a means for absorbing shock forces when a dog suddenly jerks or exerts force on the dog collar when it is connected to a stationary object or its owner by a leash.

12 Claims, 9 Drawing Sheets

DOG COLLAR

CROSS-REFERENCE TO RELATED APPLICATIONS

This application is a continuation of U.S. patent application Ser. No. 17/210,727, filed Mar. 24, 2021, which claims the benefit of U.S. Provisional Patent Application Ser. No. 62/994,910 filed Mar. 26, 2020, the contents of each of which are incorporated herein by reference.

FIELD OF THE INVENTION

The present invention relates generally a dog collar. More specifically, the invention relates to a single loop dog collar that provides both a padded inner surface and an elastic band along a portion of the perimeter of the collar. Both elements absorb shock to the neck of a dog from sudden starting and stopping when using a leash to walk the dog. Exemplary embodiments for the dog collar are disclosed herein.

BACKGROUND OF INVENTION

Any discussion of the prior art in the specification should in no way be considered as an admission that the prior art is widely known or forms part of common general knowledge in the field.

When a dog is walked, its owner typically secures a leash to either a standard single-band dog collar or a dog harness. Not unlike a human neck, the neck of a dog is a sensitive area that can easily be damaged under stress. On the underside of the neck, the larynx lies directly under the skin, and closely next to it on both sides is the thyroid gland. A little further to the side, there are large vessels that supply the brain with blood. The upper side of the neck forms the transition from the skull to the spine. Many owners know the incredible forces that occur when the dog suddenly leaps when on a leash. Likewise, many dogs know how unpleasant and even painful it can be when a person pulls the leash abruptly. Continuous strong pulling leads to a chronic inflammation of the larynx and the trachea in almost all dogs due to the constant pressure that may occur by using a standard single-band collar. Approximately 30,000 dogs are injured each year due to collar-related incidents.

Dog harnesses are typically better for walking most dogs because they fit over the dogs' chest. When a leash is connected to the harness, and the dog jerks the leash by suddenly stopping or starting, the forces exerted on the dog are distributed throughout its body rather than at the neck only. But many owners dislike using harnesses. Harnesses are cumbersome to put on the dog and they should only be worn only when the dog is walked outside. Moreover, harnesses are not typically used for training or correcting a dog's behavior. Collars are preferred to train and correct dogs' behavior safely.

SUMMARY OF THE INVENTION

The present invention overcomes these limitations and offers a solution that provides a single-band dog collar that is simple to put on a dog and that minimizes the forces applied to a dog's neck when it suddenly leaps, jerks, or pulls a leash during a walk or when it is being groomed, or it is secured to a stationary object. The dog collar minimizes the forces by providing a combination of a cushioned inner surface around the inner perimeter of the collar band that impacts the larynx, and at least one elastic band positioned between the location of the collar where the leash connecting ring is and the edge of the collar. The cushion can be either a single element or a plurality of pillow-shaped cushions. Each of the cushions are typically filled with a resilient material such as a gel, foam, rubber, or other suitable material capable of absorbing shock from sudden jerks or pulls to the collar. The cushion absorbs any sudden force applied to the larynx while the elastic band enables the collar to expand enough to absorb additional forces but not enough so that the collar can be removed from the dog's head.

The invention is summarized below only for purposes of introducing embodiments of the invention. The ultimate scope of the invention is to be limited only to the claims that follow the specification.

It is an object of this invention to provide a dog collar that is both simple to use and protects a dog's larynx and trachea from potentially damaging forces caused when the dog suddenly jerks or pulls on a leash attached to the collar during a walk.

It is a further object of this invention that the collar is a generally circular shape comprising both an inner and outer surface.

It is a further object of this invention that the inner surface of the collar comprise a plurality of pillow-shaped cushions.

It is a further object of this invention that the pillow-shaped cushions comprise an inner filling comprising of a resilient material such as gel, foam, rubber, or other suitable material.

It is a further object of this invention that the collar comprise a connecting means that comprises a male and female clasp that can join the opposing sides of the collar.

It is a further object of this invention that the collar comprise one or more elastic bands, wherein one band is secured to the collar on one end and one edge of the clasp on the other other end to enable the collar to expand when pulled.

It is a further object of this invention that the collar comprises a connecting ring for securing the leash to the collar.

In view of the above objects of the invention, the present invention provides a dog collar comprising: a rectangular band of material with first and second ends; a connecting means configured to couple and decouple the first and second ends to and from each other, the first and second ends each being fixed to a component of the connecting means; and a connecting ring fixed to the rectangular band at a position proximal to the first end; wherein the rectangular band has a padded inner surface; and wherein the rectangular band includes at least one elastic band at a position proximal to the connecting ring, the at least one elastic band being configured to stretch under a pulling force from a dog or a human.

In one embodiment of the present invention, the rectangular band of dog collar comprises an inner band and an outer band fixed to each other, the inner band providing the padded inner surface.

In yet another embodiment, the connecting means of the dog collar comprises a male clasp and a female clasp.

In yet another embodiment, the connecting ring of the dog collar is D-shaped ring.

In yet another embodiment, the padded inner surface of the dog collar comprises a plurality of cushions. These plurality of cushions can be disposed on an inner surface of the inner band. These plurality of cushions can also be filled with a shock-absorbing resilient material.

In yet another embodiment, the connecting ring of the dog collar is disposed between the at least one elastic band and the connecting means component at the first end. The connecting means component at the first end can be either a male clasp or a female clasp.

In yet another embodiment, the rectangular band of the dog collar has a second elastic band. The second elastic band can be disposed in the rectangular band at a position proximal to the second end.

A person with ordinary skill in the relevant art would know that any shape or size of the elements described below may be adopted. Any combinations of suitable number, shape, and size of the elements described below may be used. Also, any materials suitable to achieve the object of the current invention may be chosen as well.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

DETAILED DESCRIPTION OF THE INVENTION

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed. More generally in order to avoid obscuring the invention. In many cases, a description of the operation is sufficient to enable one to implement the various forms of the invention. While reference is made to a dog collar, it will be understood by those of ordinary skill that the inventive collar is suited for use with other pets or animals requiring a collar-type device. It should be noted that there are many different and alternative configurations, devices and technologies to which the disclosed embodiments may be applied. The full scope of the invention is not limited to the example(s) that are described below.

Figure 1:
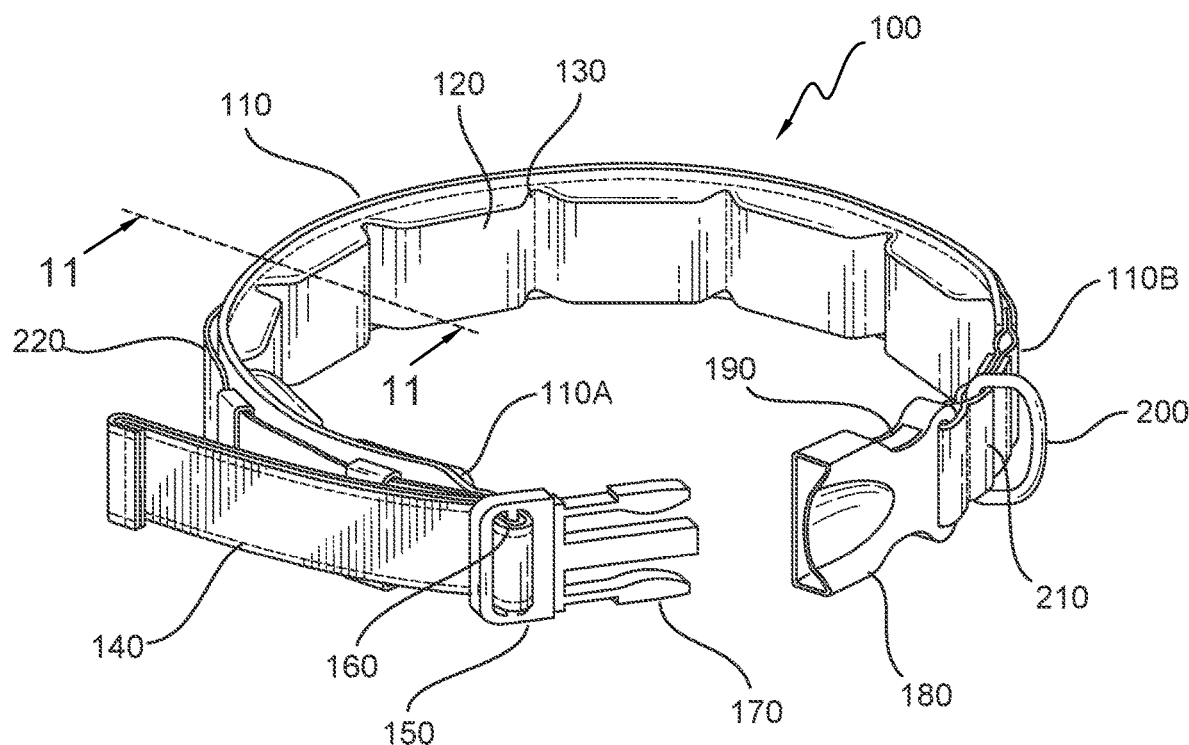
FIG. 1 illustrates a top perspective view of an exemplary dog collar in the open position.
Figure 2:
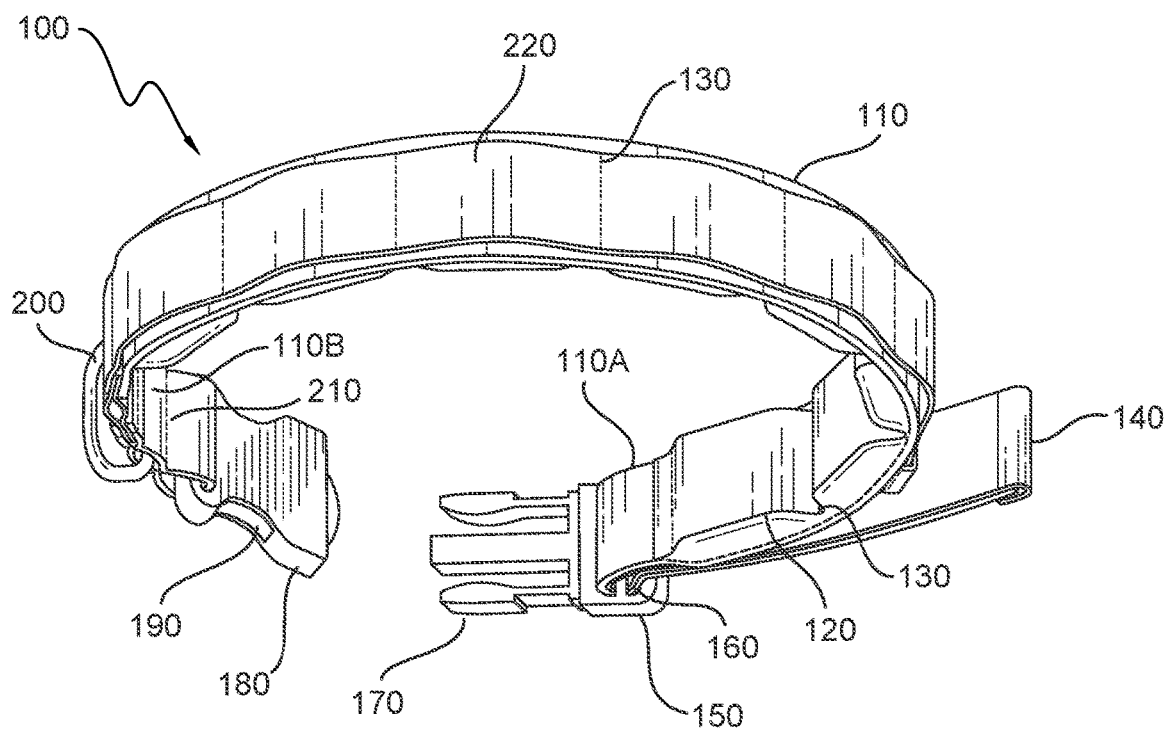
FIG. 2 illustrates a bottom perspective view of the dog collar.
Figure 3:
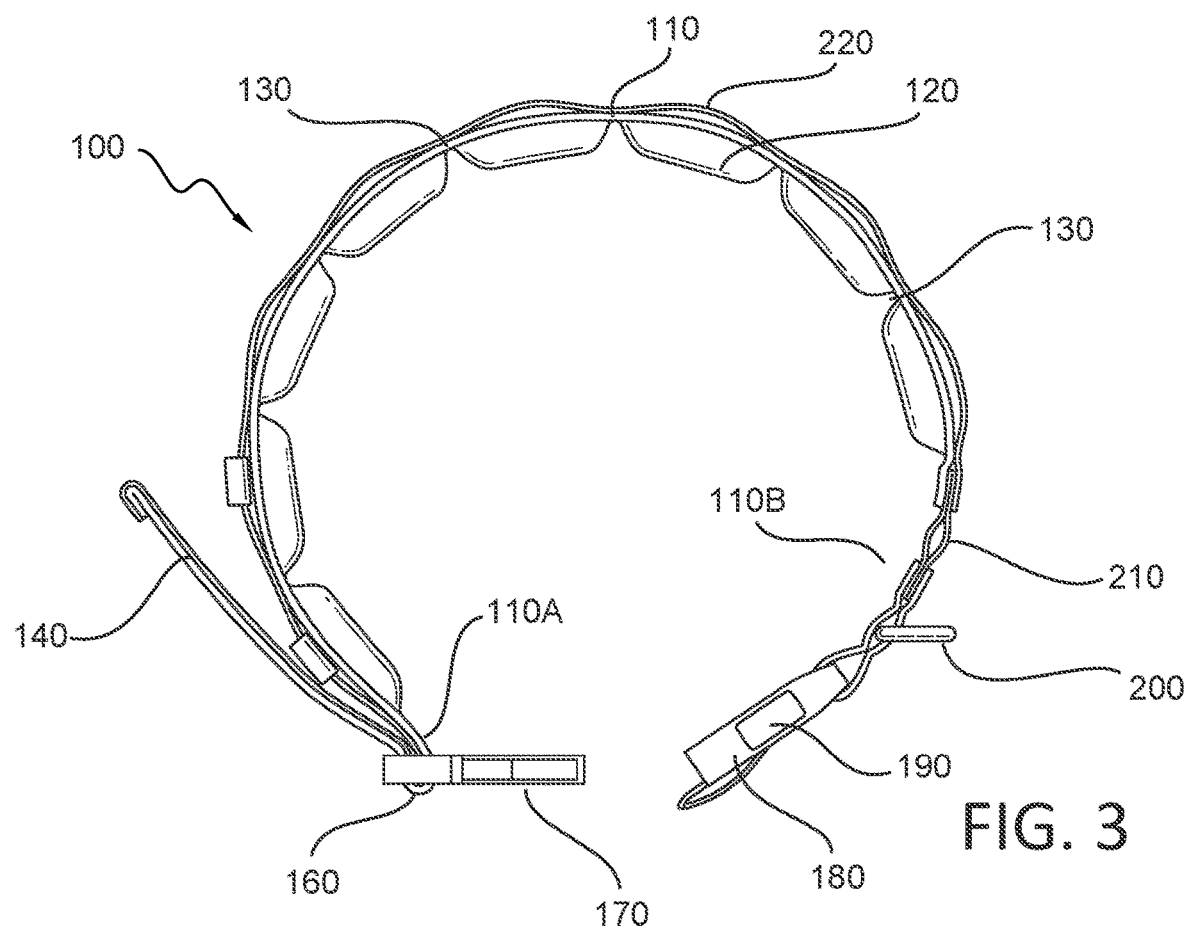
FIG. 3 illustrates a top view of the dog collar.
Figure 4:
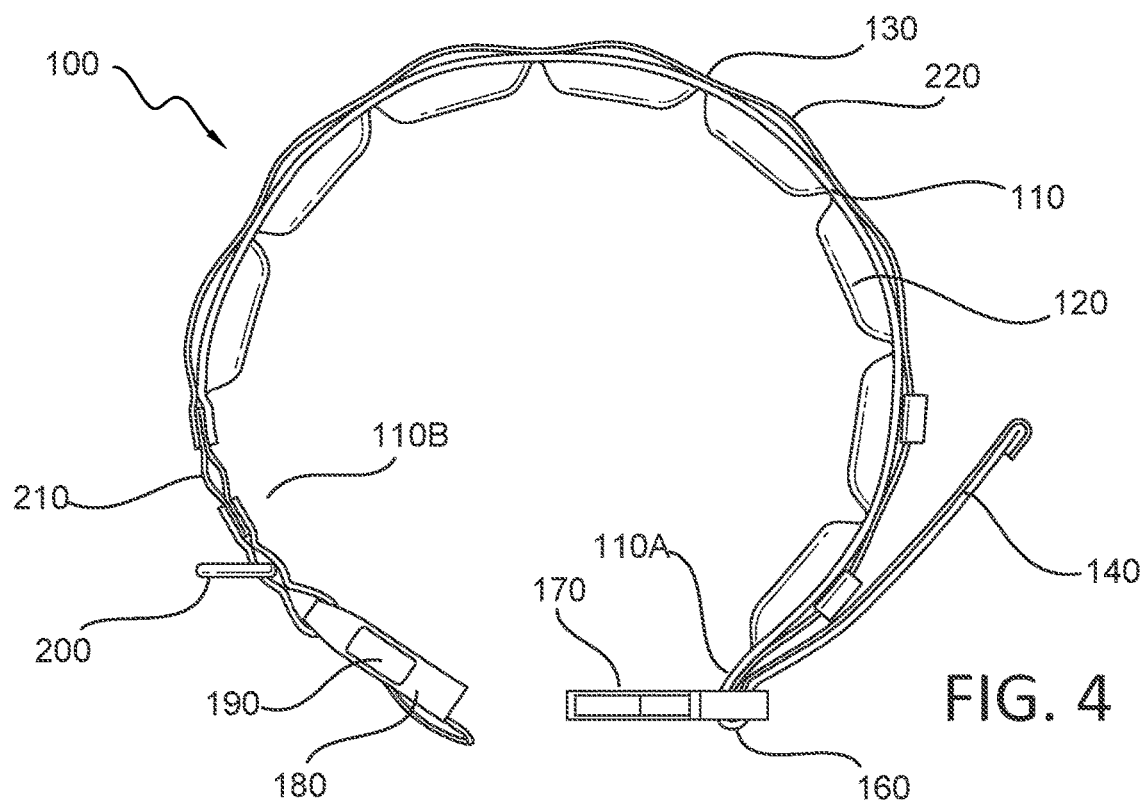
FIG. 4 illustrates a bottom view of the dog collar.
Figure 5:
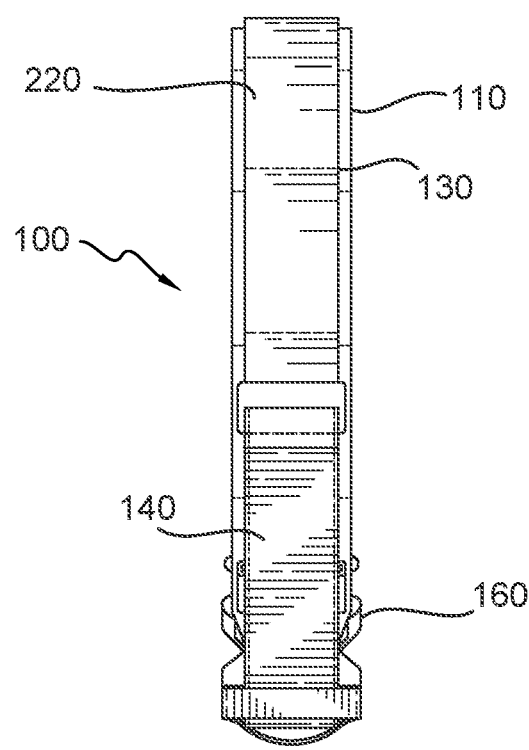
FIG. 5 illustrates a side view of the dog collar showing a first half of the back of the collar.
Figure 6:
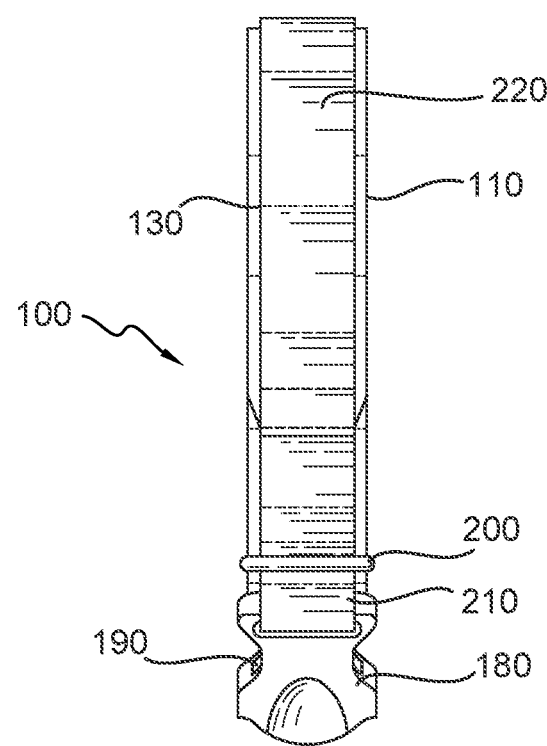
FIG. 6 illustrates a side view of the dog collar showing a second half of the back of the collar.
Figure 7:
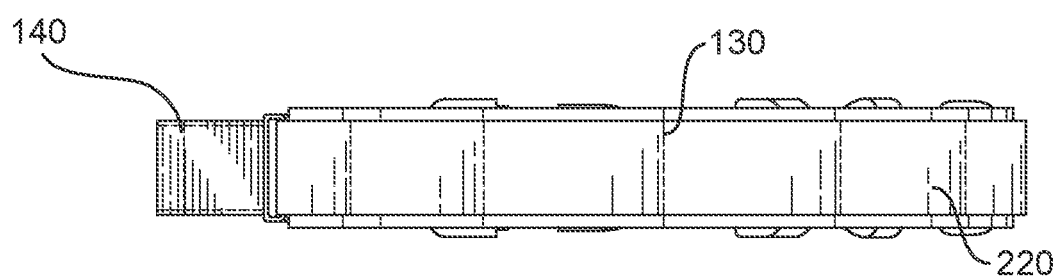
FIG. 7 illustrates an alternate side view of the dog collar showing the rear of the back of the collar.
Figure 8:
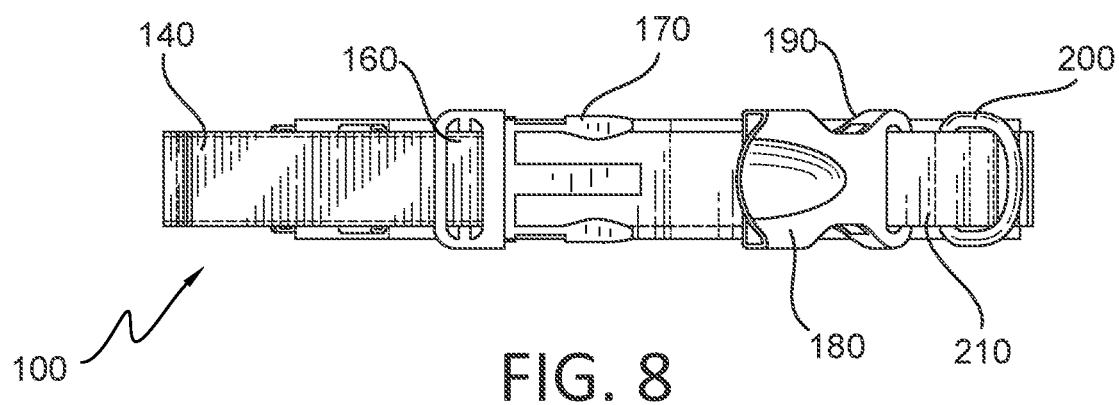
FIG. 8 illustrates an alternate side view of the dog collar showing the front of the collar in an open position.
Figure 11:
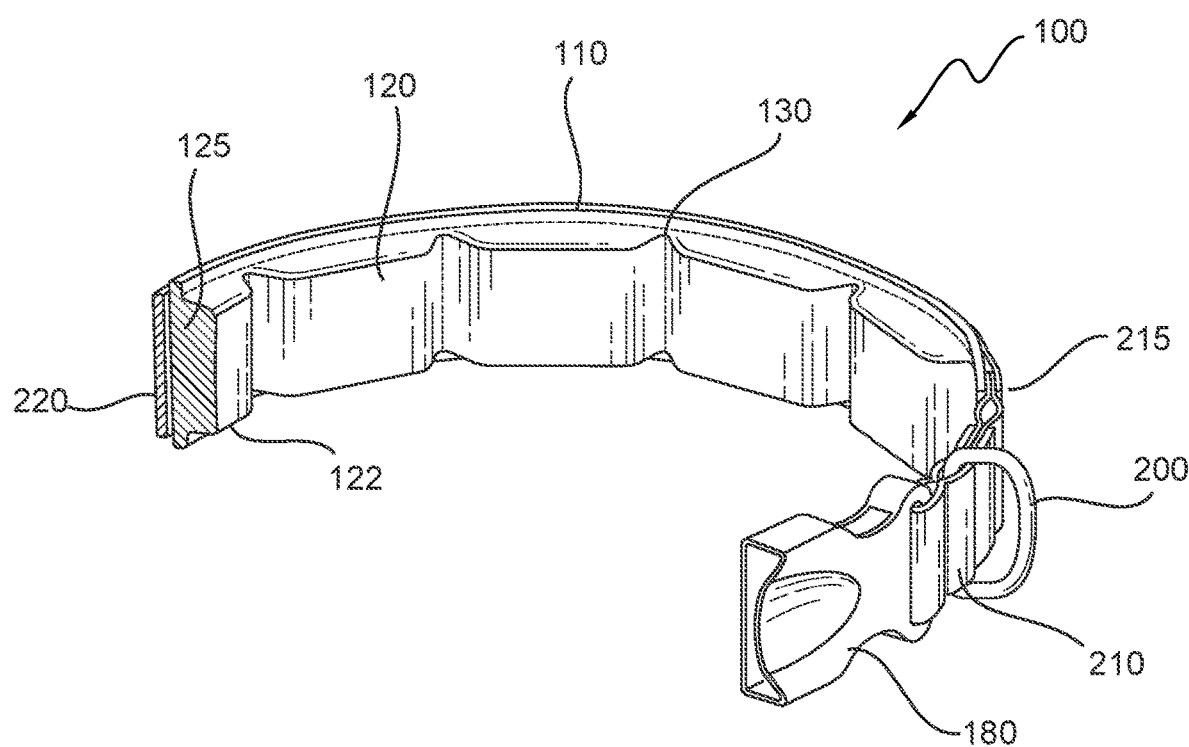
FIG. 11 illustrates a top perspective view showing a cross sectional view of a single cushion at approximately the mid-point of the band of the dog collar.

One exemplary embodiment of the present invention is shown in FIG. 1. In FIG. 1, a dog collar 100 is shown the open position. The dog collar 100 when in a fully open and extended position is generally rectangular in shape. The dog collar 100 includes an inner band 110 and an outer band 220. The inner band 110 extends from point 110A to 110B. The inner band 110 typically consists of material such as nylon, spandex, or the like. A plurality of cushions 120 are formed along the inner surface of the inner band 110. The cushions 120 are typically formed within the inner band 110 by sewing them individually and longitudinally around the perimeter of each cushion 120 as shown at point 130 into pillow shapes as shown. In the exemplary embodiment, eight pillow-shaped cushions 120 are formed. The insides of the cushions 120 comprise a resilient substance 125 (as shown in FIG. 11) such as gel, foam, rubber, stuffing, or any material that allows the cushions 120 return to their original shape after being deformed.

The outer band 220 is secured to the rear surface of the inner band 110 typically by sewing them together. The outer band 220 typically comprises a taut material such as a cloth ribbon or the like and extends from point 110A to 110B.

At point 110A, the outer band 220 and inner band 110 merge to form an extension 140. The extension 140 may form a unitary inner band 110 and outer band 220. The extension 140 is coupled to a male clasp or squeeze buckle 150. A typical male clasp 150 includes an opening 160 for securing the extension 140 by looping it through the opening 160 as shown. The extension 140, enables the dog collar 100 to be adjusted for varying neck sizes of a given dog. The male clasp 150 includes a fork-like squeeze mechanism 170 that is inserted into the female clasp 180 and snaps into the opening 190 of the female clasp 180.

Figure 13:
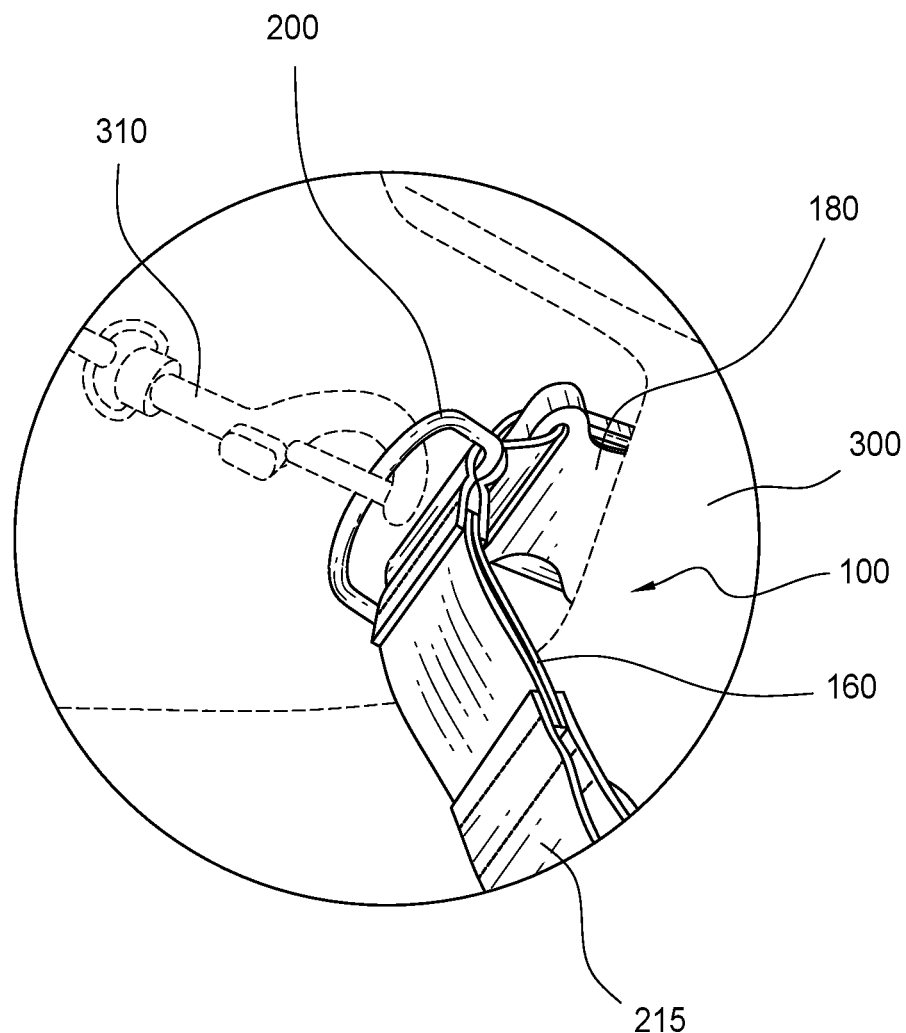
FIG. 13 illustrates a close-up view of the dog collar in use as shown in FIG. 12 as the dog collar is being pulled by the dog and showing the elastic band being pulled and elongated.

At point 110B, the outer band 220 and inner band 110 merge and are coupled to one end of an elastic band 210. A second end of the elastic band 210 is coupled either directly or indirectly to the rear of the female clasp 180. The elastic band 210 typically comprises of some form of elastic material that enable it to stretch when pulled apart. For purposes of the present invention, the term "elastic" shall have its usual and customary meaning and suitable elastic materials for inclusion in the inventive collars will be apparent to those of ordinary skill. A ring 200 is secured between the rear of the female clasp 180 and the second end of the elastic band 210. The ring 200 in the exemplary embodiment is a metal D-shaped ring. The ring 200 is where the leash 310 is connected as shown in FIG. 13.

One skilled in the art will appreciate that the orientation of ring 200 relative to male clasp 150 and female clasp 180 can be easily reversed with departing from the scope of the present invention. Ring 200 can also be secured between the rear of male clasp 150 and the second end of the elastic band 210 as shown in FIG. 10B, which is discussed further below.

FIGS. 2-8 illustrate various alternate views of the dog collar 100 in FIG. 1 in the open position.

Figure 9:
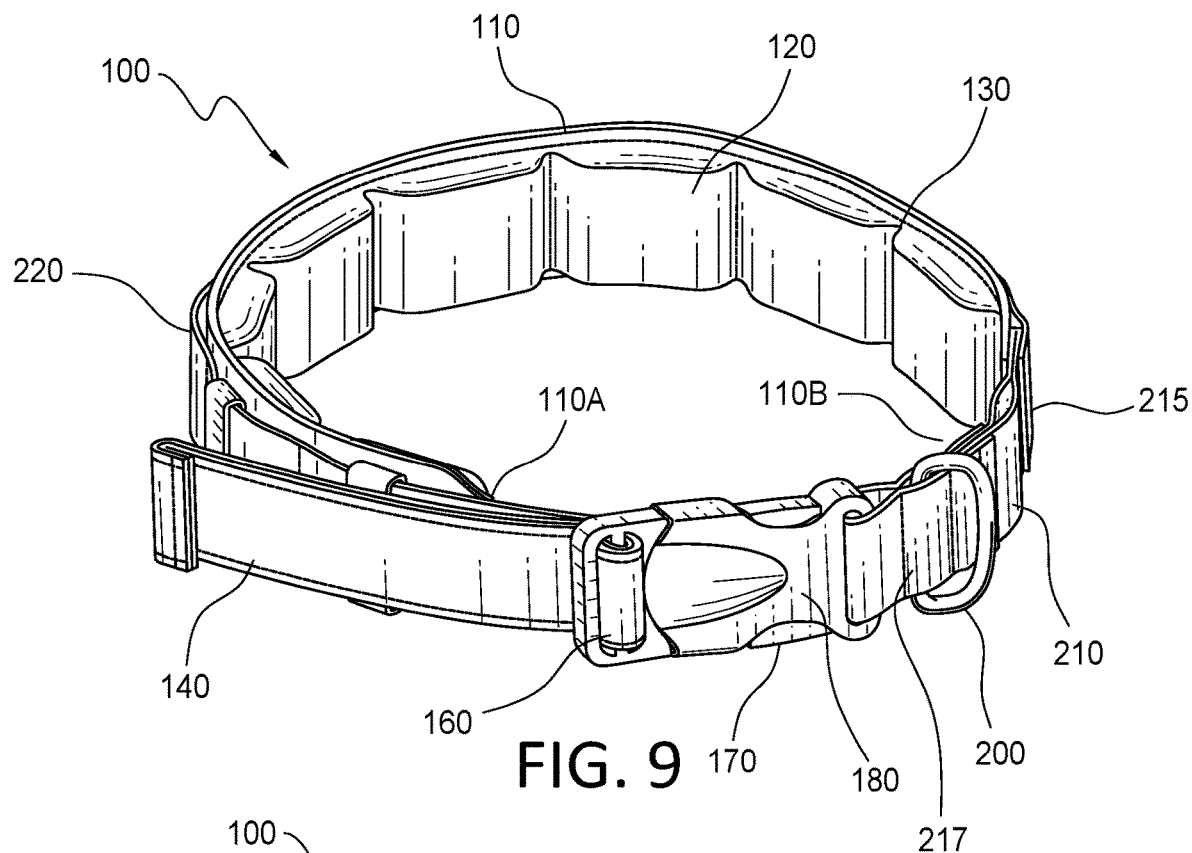
FIG. 9 illustrates a top perspective view of the dog collar in the closed position.

FIG. 9 illustrates the dog collar 100 shown in FIGS. 1-8 in the closed position. As shown, the squeeze mechanism 170 of the male clasp 150 is fully inserted into the female clasp 180 and secured in a locked position through the opening 190.

Figure 10A:
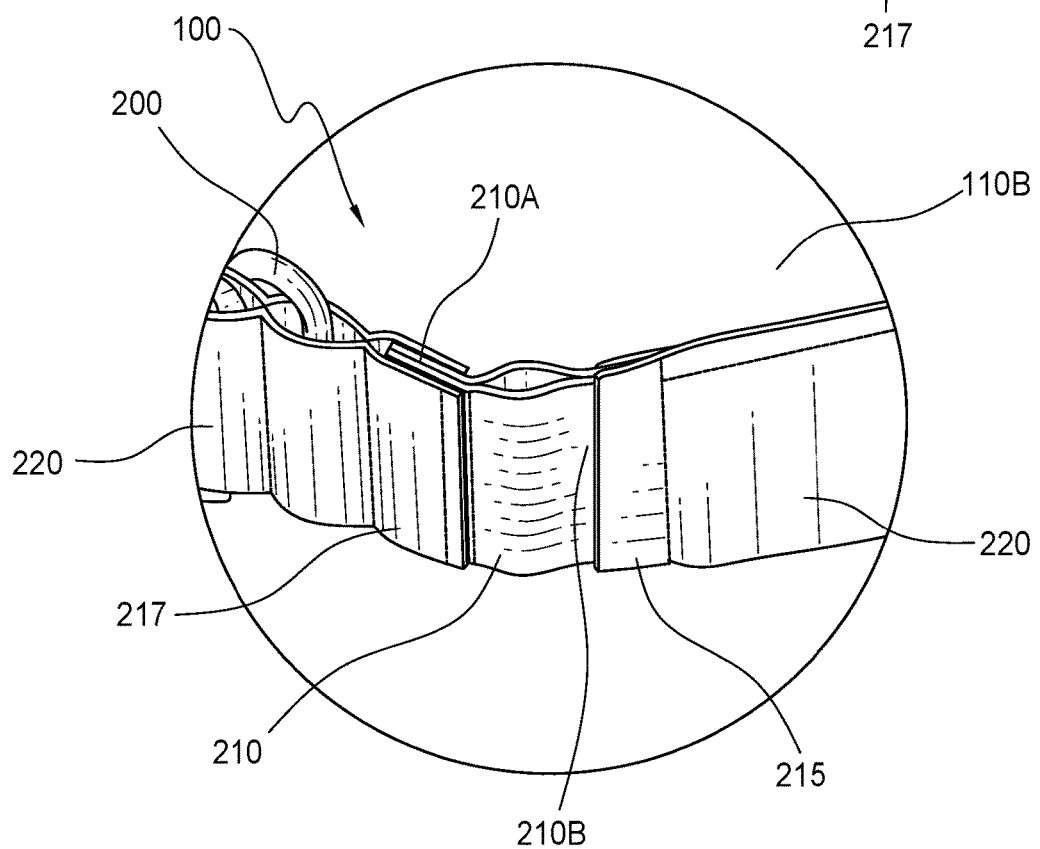
FIG. 10A illustrates a close-up view of the portion of the dog collar that includes a first elastic band.
Figure 10B:
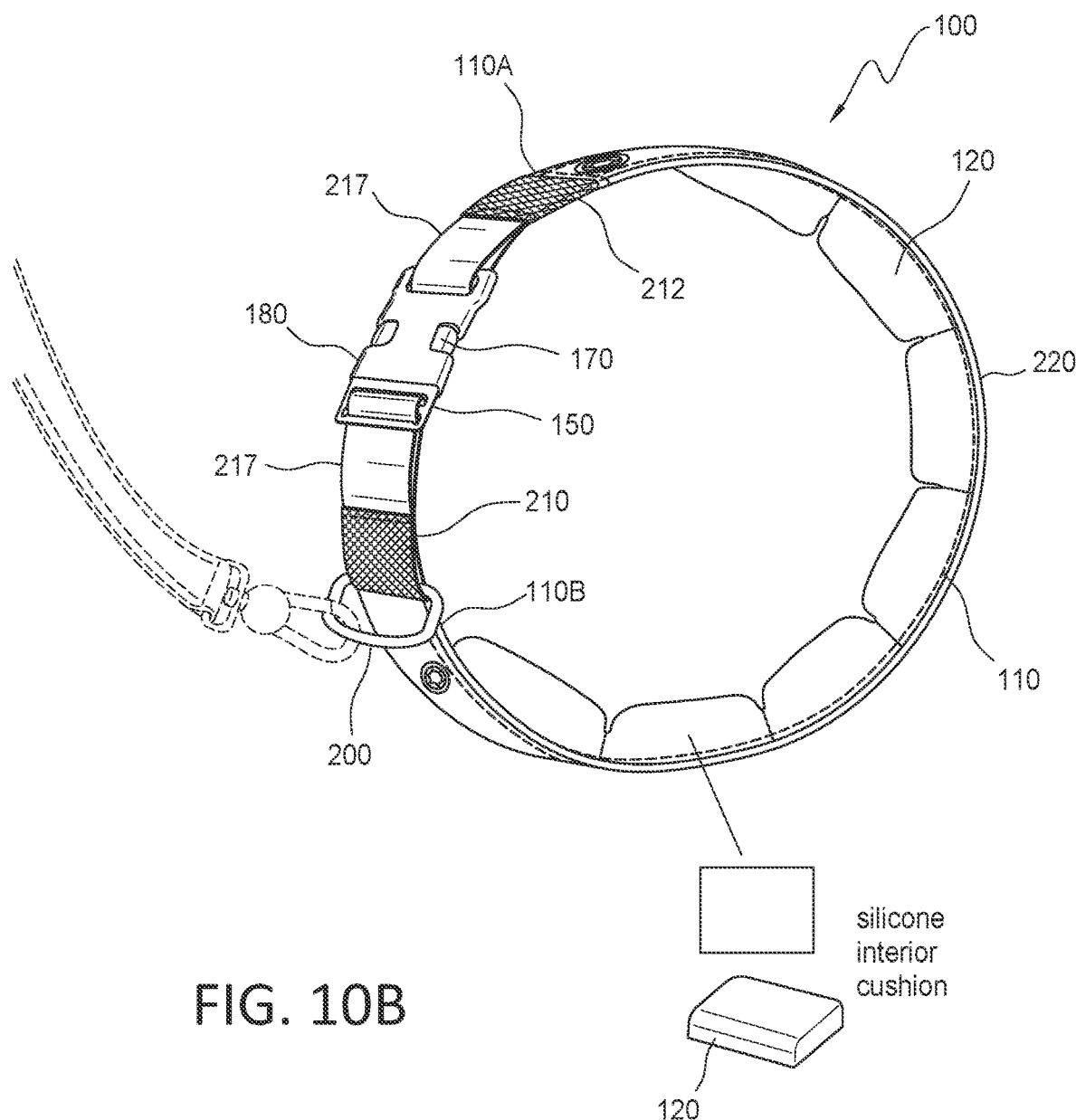
FIG. 10B illustrates a side perspective view of the dog collar that includes a second elastic band at the end of the dog collar opposite from the first elastic band.

FIG. 10A illustrates a close-up view of the portion of the dog collar 100 where the elastic band 210 joins the female clasp 180 and the inner and outer bands 110 and 220 respectively at point 110B. As shown, a merger element 215 of the outer and inner bands 220 and 110 is coupled to a second end 210B of the elastic band 210 and a coupling band 217 is coupled to a first end 210A of the elastic band 210. The coupling band 217 also includes an opening where the ring 200 loops through and is secured to the coupling band. One of ordinary skill in the art would recognize that when the opposing sides of the elastic band 210 are pulled part, the elastic band will expand outward and provide greater room within the inner perimeter of the dog collar 100.

In another embodiment, as shown in FIG. 10B, dog collar 100 includes a second elastic band 212 that joins the female clasp 180 and the inner and outer bands 110 and 220 respectively at point 110B. Second elastic band 212 is coupled to inner and outer bands 110 and 220, respectively, in the same manner as shown in FIG. 10A with the exception that coupling band 217 coupled to second elastic band 212 does not have a separate opening for a ring. This is due to the orientation of ring 200 being reversed (i.e., ring 200 is proximal to male clasp 150) as compared to the other embodiments of the invention where ring 200 is proximal to females clasp 180. The inclusion of second elastic band 212 provides further protection to a dog's larynx and trachea from potentially damaging forces caused when the dog suddenly jerks or pulls on a leash attached to the collar during a walk. Further aspects of this embodiment include the placement of the second elastic band or additional elastic bands at other points on the collar such as adjacent to the first elastic band or at other points on the collar, not shown.

As shown in FIG. 11, which is a cross sectional view of half of the dog collar 100, the resilient material 125 is shown within the cushion 122, which is one of many cushions 120.

Figure 12:
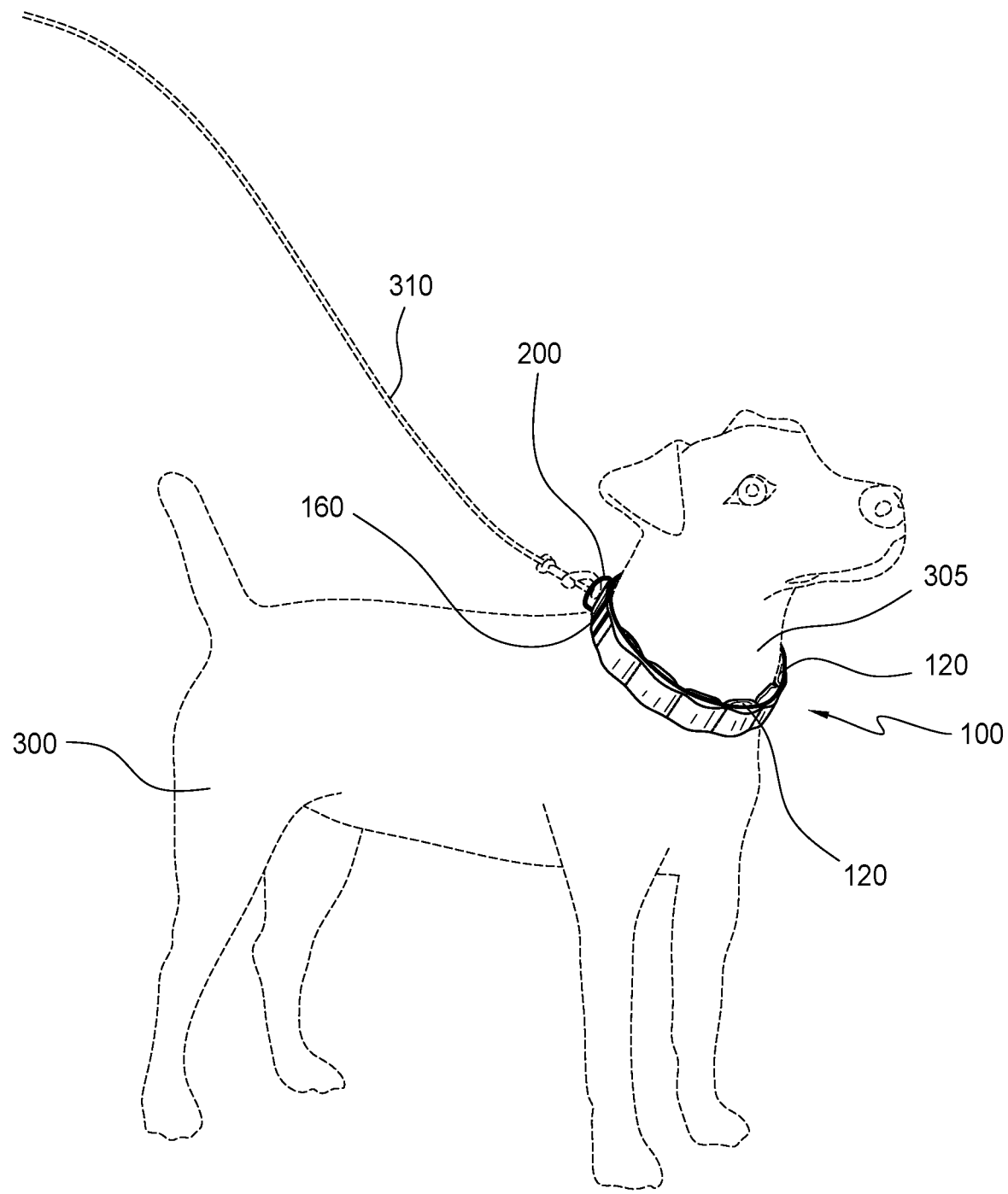
FIG. 12 illustrates the dog collar in use and connected to a leash on a dog's neck.

FIG. 12 illustrates a typical use of the dog collar 100. The dog 300 has the dog collar 100 in the locked position secured around its neck 305. A leash 310 is secured to the ring 200. In normal operation, the plurality of cushions 120 wrap around the majority of the dog's 300 neck 305 and is in direct contact with the surface of its larynx and trachea. When the leash 310 is pulled, the cushions 120 will automatically rotate 180 degrees and orientate themselves to cover the greatest portion of the sensitive areas of the neck 305 of the dog 300.

FIG. 13 shows the dog collar 100 in operation. As the dog 300 jerks, pulls, or is walking/running faster than its owner, the hook on the leash 310 pulls on the ring 200 and begins to stretch the elastic band 210. At some point, the elastic band 210 will be extended to its furthest point depending on the amount of force the dog 300 exerts on the leash. When the elastic band 210 reaches its maximum extension, the cushions 120 will begin to press against the larynx of the dog 300. As the pulling force increased, the resilient gel 125 inside the cushions will begin to deform and absorb the shock force provided by the dog 300. The combination of the elastic band 210 extending outward and the resilient gel material 125 in the cushions 120 deforming and absorbing the forces applied to them, the dog 300 will experience far less discomfort and pain than it would with a typical dog collar. The dog 300 will also avoid potentially damaging injuries to its larynx and trachea.

Figure 14A:
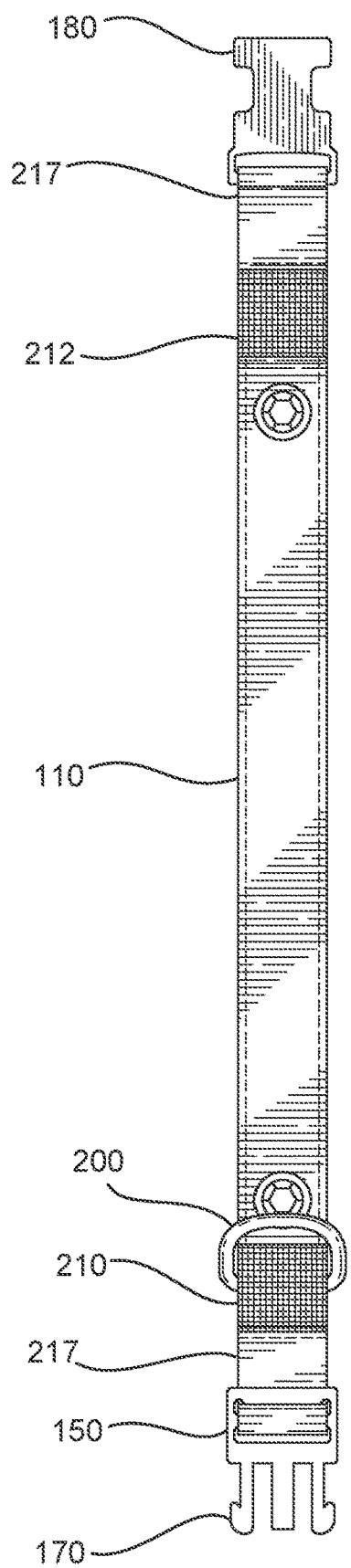
FIG. 14A illustrates a top plan view of the dog collar shown in FIG. 10B while in an open configuration.
Figure 14B:
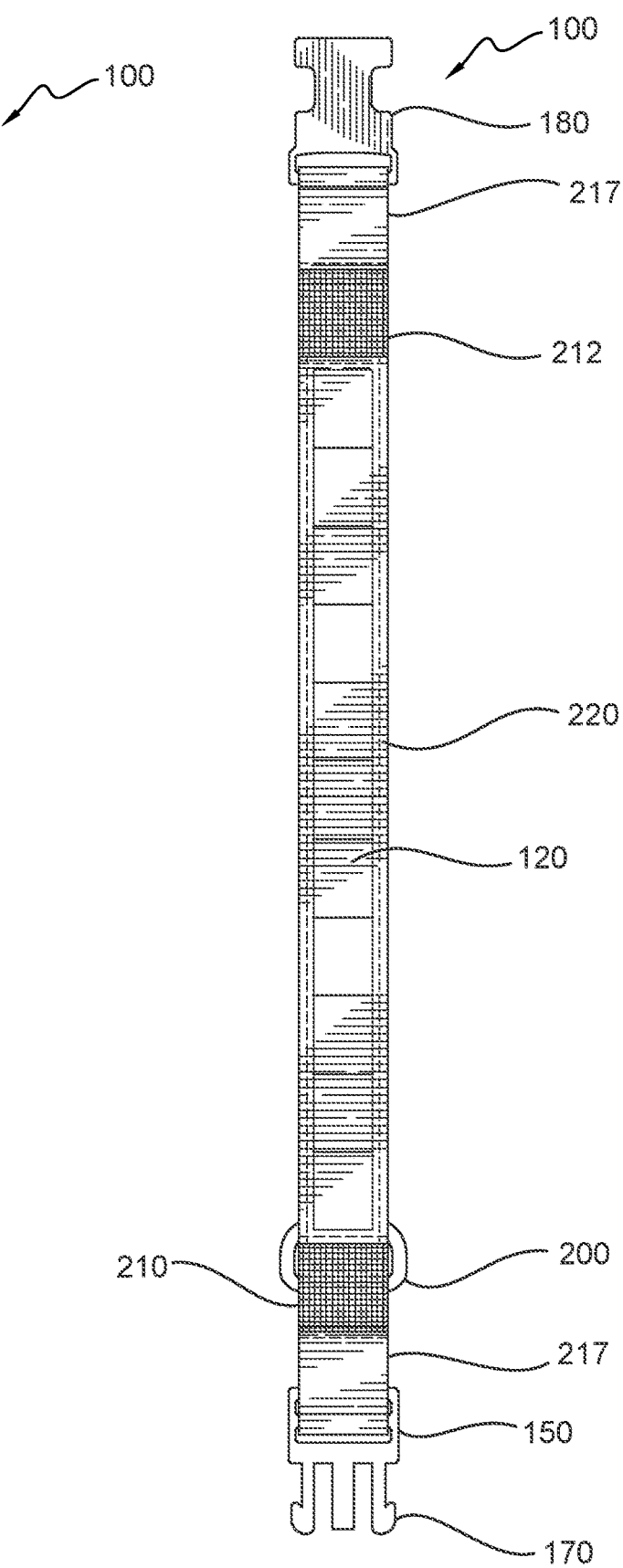
FIG. 14B illustrates a bottom plan view of the dog collar shown in FIG. 10B while in an open configuration.

FIGS. 14A and 14B are top and bottom plan views of the embodiment of collar 100 shown in FIG. 10B in an open configuration.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

We claim:

1. A dog collar comprising:
   a rectangular band of material with first and second ends;
   a connecting means configured to couple and decouple the first and second ends to and from each other, the first and second ends each being fixed to a component of the connecting means; and
   a connecting ring fixed to the rectangular band at a position most proximal to the first end;
   wherein the rectangular band includes at least one elastic band at a position most proximal to the ring, the at least one elastic band configured to stretch under a pulling force from a dog or a human;
   wherein the rectangular band further comprises an inner band and an outer band fixed to each other; and
   wherein a portion of the at least one elastic band is disposed between, and fixed to an interior surface of the inner band and to an interior surface of the outer band whereby the dog collar is expandable.

2. The dog collar of claim 1, wherein the connecting means comprises a male clasp and a female clasp.

3. The dog collar of claim 1, wherein the ring is D-shaped ring.

4. The dog collar of claim 1, wherein the inner band has a padded inner surface.

5. The dog collar of claim 4, wherein the padded inner surface comprises a plurality of cushions disposed on a surface of the inner band opposite from the at least one elastic band.

6. The dog collar of claim 5, wherein the plurality of cushions is filled with a shock-absorbing resilient material.

7. The dog collar of claim 1, wherein the ring is disposed between the at least one elastic band and the connecting means component at the first end.

8. The dog collar of claim 7, wherein the connecting means component at the first end is a male clasp.

9. The dog collar of claim 7, wherein the connecting means component at the first end is a female clasp.

10. The dog collar of claim 1, wherein the rectangular band has a second elastic band configured to stretch under a pulling force from a dog or a human, a portion of the second elastic band being disposed between, and fixed to the interior surface of the inner band and to the interior surface of the outer band.

11. The dog collar of claim 10, wherein the second elastic band is disposed in the rectangular band a position most proximal to the second end.

12. The dog collar of claim 1, wherein the at least one elastic band has an opening configured to receive the connecting ring and the connecting ring is disposed in the opening.

\* \* \* \* \*